US005087924A

United States Patent [19]

Zaba et al.

[11] Patent Number: 5,087,924

[45] Date of Patent: Feb. 11, 1992

[54] CONTINUOUS INK JET PRINTER

[75] Inventors: Jerzy M. Zaba, Impington; Howard J. Manning, Cambridge, both of England

[73] Assignee: Domino Printing Sciences PLC, United Kingdom

[21] Appl. No.: 644,507

[22] Filed: Jan. 23, 1991

[30] Foreign Application Priority Data

Jan. 24, 1990 [GB] United Kingdom ............... 90-01606

[51] Int. Cl.$^5$ ............................................ G01D 15/18

[52] U.S. Cl. .................................. 346/75; 346/140 R

[58] Field of Search ............................. 346/75, 140 R

[56] References Cited

U.S. PATENT DOCUMENTS 4,007,465 2/1977 Chanphary ..................... 346/140 R 4,550,325 10/1985 Viola .............................. 346/140 R

*Primary Examiner*—Benjamin R. Fuller

*Assistant Examiner*—Gerald E. Preston

*Attorney, Agent, or Firm*—Venable, Baetjer & Howard

[57] ABSTRACT

A printhead for a continuous ink jet printer has a body with a circular recess in an end face thereof. A circular piezoelectric transducer is disposed in the recess so as to provide a short ink chamber adjacent the face of the body and the piezoelectric transducer is arranged to expand and contract in the direction of its axis when an excitation voltage is applied to it. An ink feed channel connects with the recess for feeding ink to the ink chamber and a nozzle plate is detachably mounted on the end face of the body to eject ink under pressure when the piezoelectric transducer is actuated.

8 Claims, 5 Drawing Sheets

Fig 4.a.
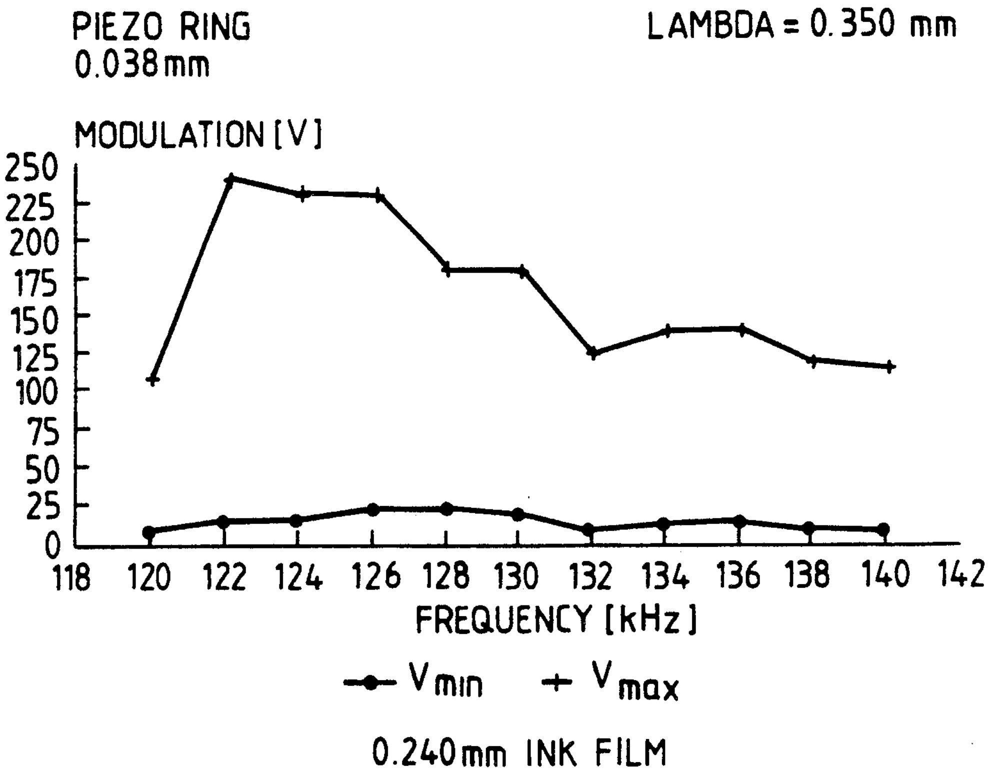

CONTINUOUS INK JET PRINTER

The present invention relates to ink jet printers and, more particularly, to the printhead of a so-called continuous ink jet printer.

Printers of this type have a printhead with one or more nozzles connected to a supply of ink, a string of droplets being caused to flow from the nozzle or nozzles by means of an oscillator, usually a piezoelectric transducer. The row of droplets is directed towards a gutter, but selective droplets can be charged as they leave the nozzle and then deflected in an electric field in order to impinge on a substrate, individual droplets being charged appropriately in order to print at the correct position.

The piezoelectric transducer is normally arranged to modulate the pressure applied to a column of ink within the printhead, thus causing the break-up of a continuous stream of ink ejected from the nozzle into droplets at a distance below the nozzle exit. However, such a system is resonant at a particular frequency and thus prior art technology requires separate drop generators for every nozzle size and corresponding frequency. Such systems contain components which are designed for specific frequencies, eg. drive rod length, length of the ink path between drive rod and nozzle, gun body, etc. The frequency response of such a resonant system is as shown in FIG. 3.

There is a need to provide a printhead which does not suffer from these restrictions.

According to the present invention a printhead for a continuous ink jet printer comprises:

a body having a circular recess in an end face thereof;

a circular piezoelectric transducer disposed in the recess so as to provide a short ink chamber adjacent the face of the body, the piezoelectric transducer being arranged to expand and contract in the direction of its axis when an excitation voltage is applied thereto;

an ink feed channel connecting with the recess for feeding ink to the ink chamber; and a nozzle plate detachably mounted on the end face of the body and having one or more nozzles disposed to eject ink under pressure when the piezoelectric transducer is actuated.

In the present specification, the term "circular" is also taken to include "annular". Thus, the recess in the end face of the body may be annular as may the piezoelectric transducer disposed within it.

By constructing the printhead in this fashion and thus providing a thin, disc-like volume of ink adjacent the nozzle, the drop generator cannot resonate at the excitation frequency across the thickness of disk-like volume because the thickness is much less than the corresponding wavelength of sound in the ink. There are a number of advantages:

- a common printhead can be used for all frequencies and nozzle sizes;
- the printhead is insensitive to ink types within certain viscosity limits (1.5–15 cp);
- the printhead is insensitive to mechanical tolerances;
- a reduced number of components can be used, therefore lowering the cost of the printhead.

The present invention may also be used in conjunction with the invention disclosed in our co-pending PCT patent application no. PCT/GB90/01010, in which a plunger with a closure member at its free end is disposed in a central bore to close off the nozzle at the end of printing. In this case, the recess will surround the central bore, being connected to it by a generally radial ink passageway.

One example, together with a modification of that example, of a printhead constructed in accordance with the present invention will now be described with reference to the accompanying drawings, in which:

FIGS. 4A, 4B and 4C show graphs of the frequency response of a three different non-resonant printheads according to the invention.

Figure 1:
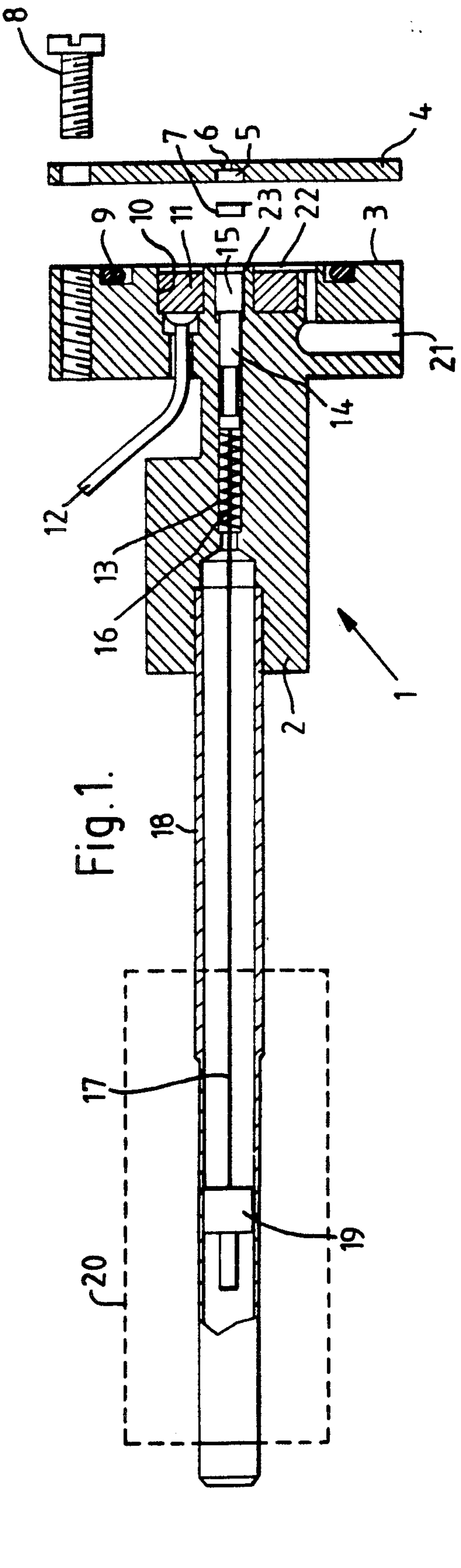
FIG. 1 is a partial longitudinal section through the printhead.

FIG. 1 shows a printhead 1 having a cast metal body 2, to an end face 3 of which is fitted a metallic nozzle plate 4 having a recess 5 and an ink ejection channel 6, with a jewelled nozzle 7 being received therein in order to define the aperture size to the precise dimensions required. The figure shows these components in an exploded arrangement for clarity. The nozzle plate 4 is clamped to the body 2 by means of appropriate bolts 8 and a synthetic rubber O-ring 9 seals the nozzle plate 4 to the end face 3.

An annular recess 10 in the body 2 houses a likewise annular piezoelectric transducer 11 which is actuated by an excitation current at a controllably variable voltage supplied through a wire 12. The piezoelectric transducer is recessed, as shown, from the end face 3 of the body so as to leave a thin annular gap, of less than 0.5 mm, for an ink chamber 22.

Coaxially disposed inside the annular recess 10 is a bore 13 which contains a plunger 14 carrying a closure member 15 for closing off the nozzle 7 when the printer is inactive. The plunger is actuated by a solenoid 20 via an armature 19 and a connecting wire 17 sliding in a flexible tube 18. The plunger is biased forwards by a coil spring 16. Other types of actuator may be provided for operation of the closure member 15 depending on the particular printhead.

An ink supply passage 21 feeds ink from an externally mounted reservoir (not shown) to the disk-like chamber 22, from where ink is passed to the end of the bore 13, between the closure member 15 and the nozzle 7.

In use, excitation of the piezoelectric transducer modulates the pressure of ink (or other marking fluid) to be printed, in the chamber 22, causing pressure fluctuations which in turn, after ink has been ejected through the jewelled nozzle 7, cause the stream of ink to break up into droplets.

Figure 2:
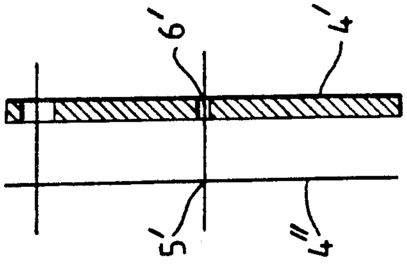
FIG. 2 shows a modified nozzle arrangement.

FIG. 2 shows an alternative construction for the nozzle plate 4', in which the plate 4' has a central ink passageway 6' and provides rigidity for a thin, foil or membrane-like plate 4' through which a central aperture 5' may be electro-formed.

A comparison with a conventional piezoelectric transducer arrangement in a printhead is useful.

Figure 3:
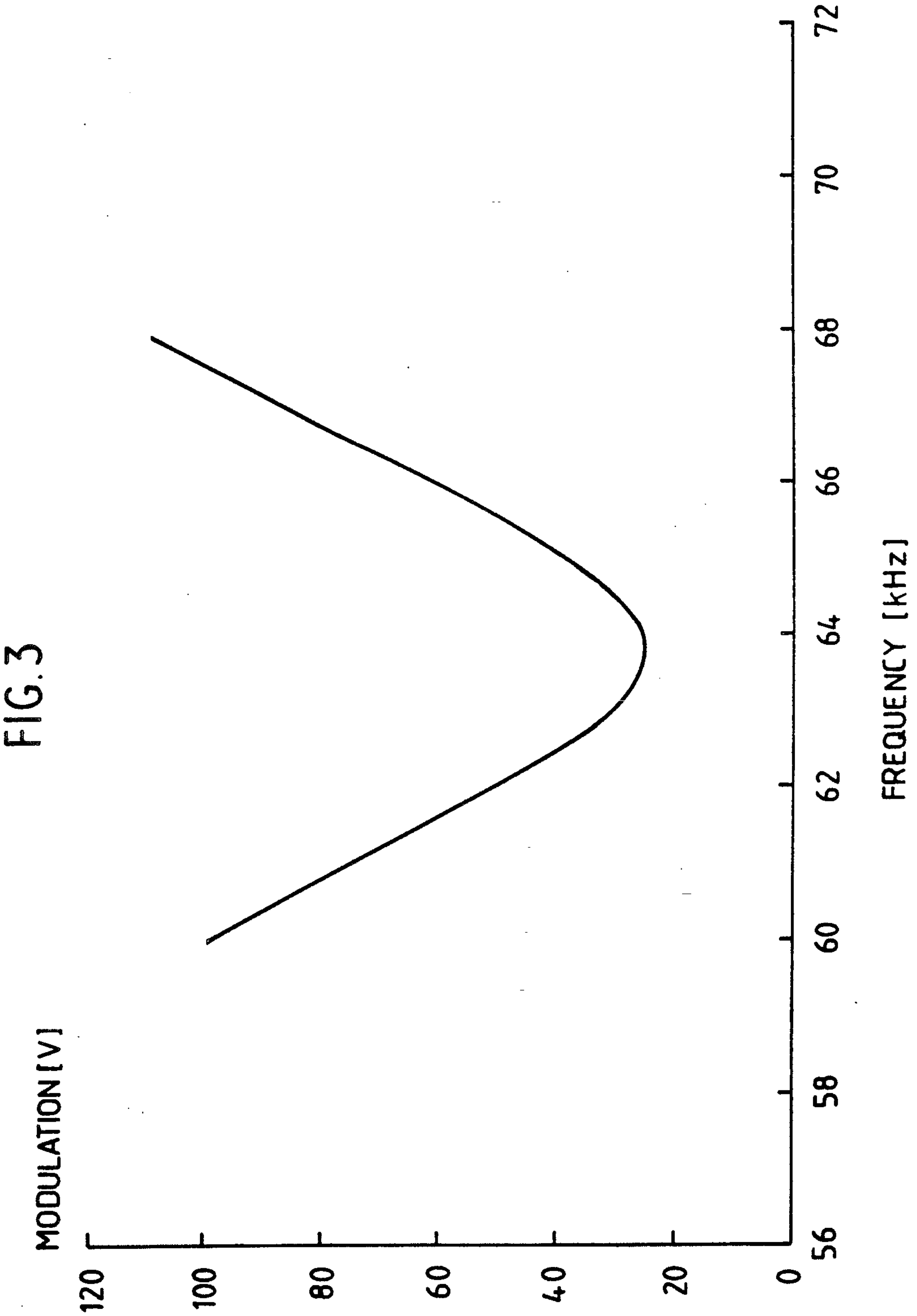
FIG. 3 shows a representation of the frequency response of a resonant system.

From FIG. 3 it can be seen that the graph of modulation voltage with frequency is non-linear, resulting in resonance.

Figure 4B:
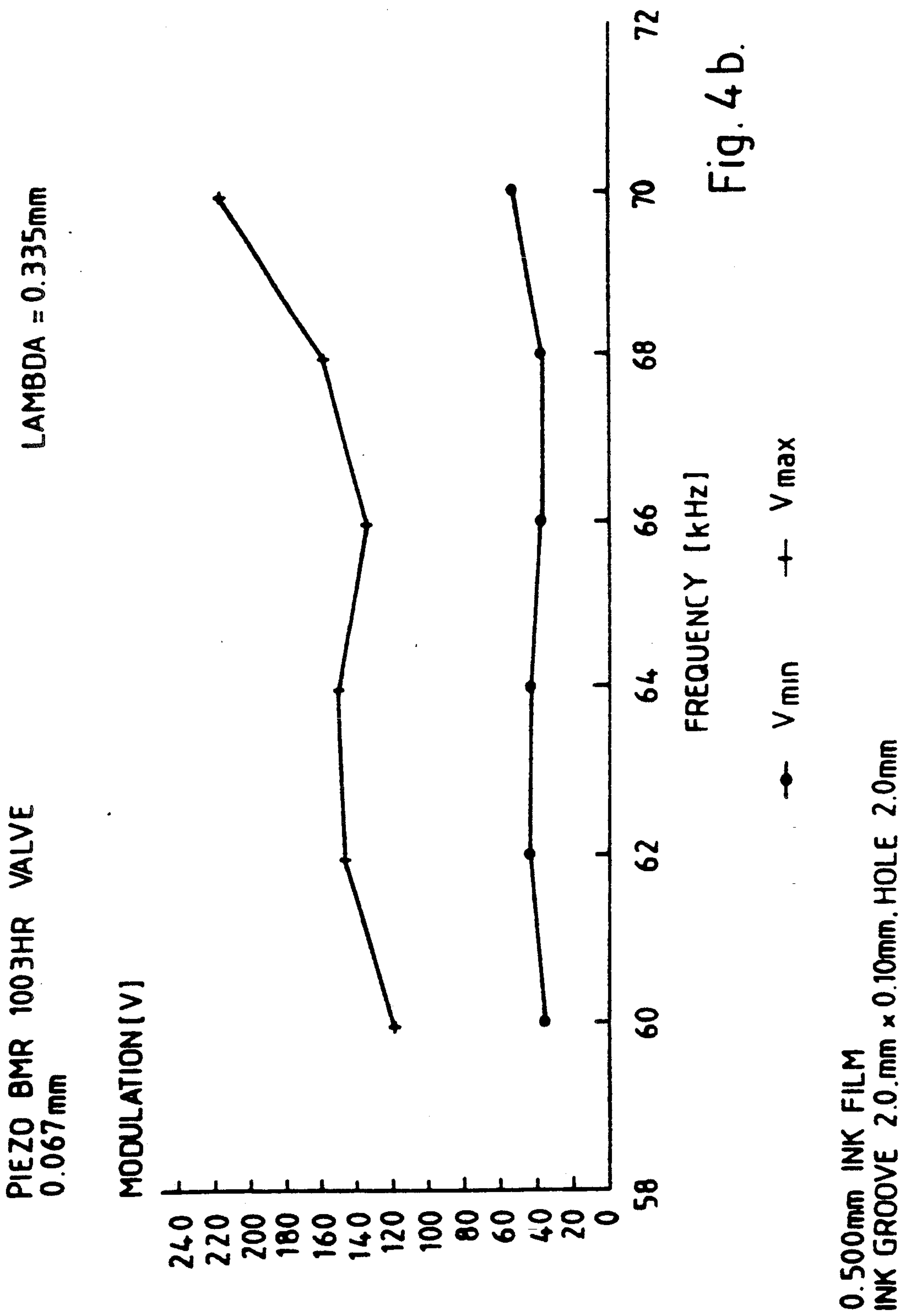
Figure 4C:
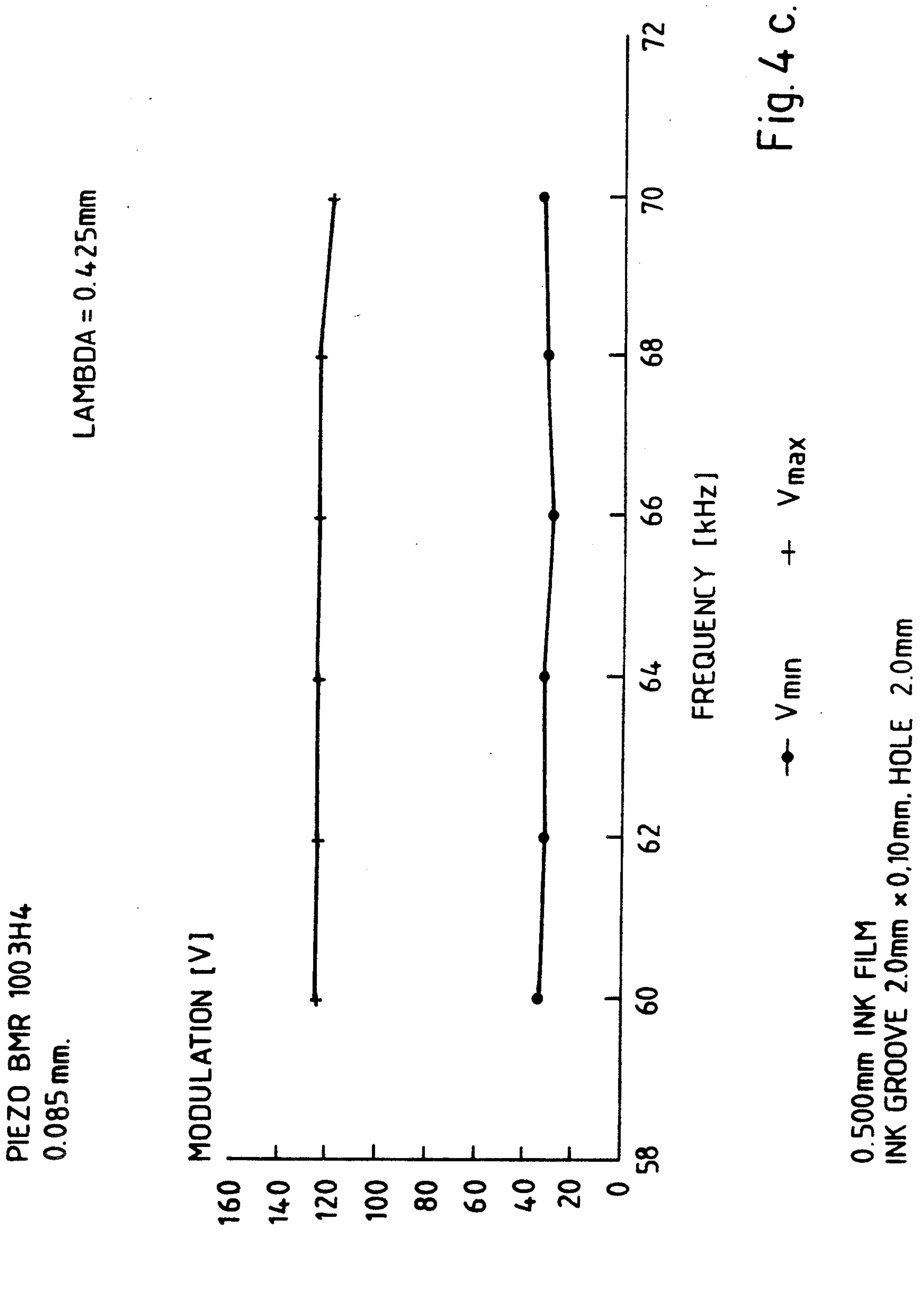

FIGS. 4A, 4B, and 4C illustrate how the maximum and minimum driving modulation voltages $V_{max}$ and $V_{min}$ vary with the frequency of the driving (modulation) voltage V for different nozzle sizes and central operating frequencies.

The printheads to which these graphs relate each show a much reduced sensitivity to temperature changes, thus reducing the changes in viscosity and resultant controlled compensation required.

What we claim is:

1. A printhead for a continuous ink jet printer, said printhead comprising:

a body, said body having an end face defining a circular recess;

a circular piezoelectric transducer disposed in said recess and defining with said body a short ink chamber adjacent the end face of the body, said piezoelectric transducer being adapted to expand and contract in a direction of a radial axis of said transducer when an excitation voltage is applied thereto;

an ink feed channel connecting with said recess for feeding ink to said ink chamber;

a nozzle plate detachably mounted on said end face of said body, said nozzle plate having one or more nozzles disposed to eject ink under pressure when said piezoelectric transducer is actuated.

2. A printhead according to claim 1, wherein said recess and said transducer are annular.

3. A printhead according to claim 2, wherein said body further defines a central bore positioned coaxially with said annular recess and said nozzle, and a closure member disposed in said bore and reciprocable therewithin to open and close said nozzle.

4. A printhead according to claim 3, wherein said body defines a radial passage, said passage connecting an end of said bore adjacent to said nozzle with said ink chamber.

5. A printhead according to claim 1, wherein said nozzle comprises an apertured jewel located in said nozzle plate.

6. A printhead according to claim 1, wherein said nozzle comprises a membrane plate, said plate defining an aperture therethrough, and said membrane plate being disposed between said nozzle plate and an end face of said printhead body.

7. A printhead according to claim 1, further including an O-ring, said O-ring being disposed in surrounding relation with said recess to seal said end face to said nozzle plate.

8. A printhead according to claim 6, further including an O-ring, said O-ring being disposed in surrounding relation with said recess to seal said end face to said membrane plate.

* * * * *